(12) United States Patent
Herrmann (10) Patent No.: US 6,706,439 B2
(45) Date of Patent: Mar. 16, 2004

(54) PRESSURE DRIVEN HERMETICALLY SEALED PUMP FOR FUEL CELL SYSTEM

(75) Inventor: Manfred Herrmann, Ginsheim (DE)

(73) Assignee: General Motors Corporation, Detroit, MI (US)

( * ) Notice: Subject to any disclaimer, the term of this patent is extended or adjusted under 35 U.S.C. 154(b) by 161 days.

(21) Appl. No.: 10/028,758

(22) Filed: Dec. 20, 2001

(65) Prior Publication Data

US 2002/0119361 A1 Aug. 29, 2002

Related U.S. Application Data (63) Continuation-in-part of application No. 09/997,397, filed on Nov. 29, 2001, now abandoned.

(30) Foreign Application Priority Data

Dec. 15, 2000 (DE) .......................... 100 62 673
Jul. 20, 2001 (DE) .......................... 101 35 625

(51) Int. Cl.[7] .............................................. H01M 8/04
(52) U.S. Cl. ............................................ 429/34; 429/25
(58) Field of Search ................................ 429/25, 34

(56) References Cited

U.S. PATENT DOCUMENTS

2002/0081471 A1 * 6/2002 Keegan et al. .............. 429/25
2003/0008184 A1 * 1/2003 Ballantine et al. ........... 429/13

FOREIGN PATENT DOCUMENTS

WO 99/05741 2/1999

* cited by examiner

Primary Examiner—John S. Maples
(74) Attorney, Agent, or Firm—Cary W. Brooks (57) ABSTRACT

A hydrogen feed system for a fuel cell arrangement in which the hydrogen can be taken at a higher pressure from a supply tank standing under pressure or under pressure from a reforming device and can be fed after relaxation to a lower pressure into the fuel cell arrangement, with a return flow loop being provided in the hydrogen circuit, so that a part of the non-consumed hydrogen emerging from the fuel cell arrangement can be fed back into the latter, is characterized in that a pump is provided which brings about the recirculation of the hydrogen and which can be driven from the pressure energy of the hydrogen taken from the tank or coming from a reforming unit.

34 Claims, 3 Drawing Sheets

PRESSURE DRIVEN HERMETICALLY SEALED PUMP FOR FUEL CELL SYSTEM

RELATED APPLICATION

This is a continuation-in-part of U.S. patent application Ser. No. 09/997,397 filed on Nov. 29, 2001, now abandoned, and assigned to the assignee of the present invention.

TECHNICAL FIELD

The present invention relates to a hydrogen feed system, in particular but not exclusively to a hydrogen feed system for a fuel cell arrangement in which the hydrogen can be taken at higher pressure from a supply tank standing under pressure or under pressure from a reforming device and can be fed after relaxation to a lower pressure into the fuel cell arrangement, with a return flow loop being provided in the hydrogen circuit, so that a part of the non-consumed hydrogen emerging from the fuel cell arrangement can be fed back into the latter.

BACKGROUND OF THE INVENTION

Fuel cells are known in diverse forms. The present invention is, however, only concerned with fuel cells which operate with hydrogen as a fuel. Such fuel cells are known in the form of so-called PEM fuel cells (Proton Exchange Membrane fuel cells). A fuel cell arrangement based on PEM fuel cells can admittedly consist of a single fuel cell, but normally consists of a stack of fuel cells arranged above one another or alongside one another, which together form a so-called stack. Each fuel cell has a proton permeable membrane with electrodes on both sides, and indeed a cathode and an anode, which both have a catalytic coating. Hydrogen is supplied to the stack at the anode side at a certain overpressure, i.e. pressure above atmospheric pressure. At the cathode side air is likewise supplied to the stack with a suitable overpressure. In the operation of the fuel cell protons, which are delivered by the hydrogen, diffuse through the membrane and react at the cathode side of the membrane with the air that is supplied. In this way, water vapor is formed on the one hand which is led away as an exhaust gas at the cathode side and, on the other hand, current is produced, which can, for example, be used to drive a vehicle in which the fuel cell arrangement is incorporated.

At the anode side of the fuel cell arrangement excess hydrogen, i.e. not yet consumed hydrogen, leaves the stack and is either burned in order to produce heat or is at least partly returned to the stack via a return loop, that is to say recirculated. A procedure of this kind has certain advantages. It is on the one hand more economical and, on the other hand, the return of the hydrogen ensures that adequate moisture is always present, so that the membranes remain moist. This is an important precondition for the disturbance-free operation of a fuel cell.

It is thus known to return at least a part of the non-consumed hydrogen emerging from the fuel cells to the fuel cell arrangement again. In order to achieve this, a pressure increase must, however, take place, because the pressure at the inlet side of the fuel cell arrangement is higher than at the outlet side. This pressure increase, however, proves to be problematic. Since hydrogen molecules are small, the pumping of hydrogen is difficult and the danger of leakages is very great. Motor-operated pumps, in which the motor is arranged outside of the hydrogen circuit, are problematic in practice because it is extremely difficult to adequately seal the rotating drive shaft of the pump. Hydrogen leakages are, however, extremely dangerous, particularly when a vehicle is stationary, because they can lead to an ignitable gas mixture.

In order to avoid the use of such pumps, it has already been proposed, in the international application with the publication no. WO 99/05741, to use so-called eductors. These consist of a nozzle with a convergent section and a divergent section and hydrogen is injected at a higher pressure into the narrow throat between the convergent section and the divergent section, whereby a suction action takes place with an increase in pressure, so that hydrogen is sucked in at a lower pressure at the convergent side and emerges with a pressure increase at the divergent side. An eductor has the advantage that it can be relatively easily sealed, since there are no moving parts. It is, however, problematic that the eductor first functions correctly with a certain throughput, so that a second eductor is necessary in order to maintain the hydrogen circulation at low flow rates. In the second eductor water is injected into the narrow throat between the convergent and the divergent section for which a water supply and a water pump are required and it is clear that the duration of the operating time is restricted because the available quantity of water is restricted. Through the different components that are required a system of this kind also proves relatively complex and leakages must also be feared here.

The object of the present invention is to provide an apparatus which makes it possible to obtain the pressure increase required for a hydrogen recirculation at a relatively favorable cost without having to fear leakages.

SUMMARY OF THE INVENTION

In order to satisfy this object, provision is made in accordance with the invention, in a hydrogen feed system of the initially named kind, for a pump to be provided which brings about the recirculation of the hydrogen and which can be driven by the pressure energy of the hydrogen taken from the tank or coming from a reforming unit.

Viewed differently, the solution of the invention consists in the provision of a pump which is connected to the fuel cell arrangement in order to carry out the hydrogen recirculation; in the hydrogen coming from the supply tank or from a reforming unit being supplied to the pump to drive the pump, and in the hydrogen which is relaxed by the driving of the pump being supplied together with the recirculated hydrogen to the fuel cell arrangement.

Since the recirculation of the hydrogen takes place by a pump operated by the hydrogen itself, in particular in the form of a displacement pump, this pump can be fully accommodated within the hydrogen circuit, so that the pump is fully integrated into the line system and no shaft passes through the wall of the line system, so that leakages at shaft lead-throughs cannot occur. All line connections must admittedly be sealed against hydrogen now as previously, this problem can, however, be solved substantially more simply, because no movable parts are present at the line connections in operation. The pump is, so to say, hermetically sealed off relative to the environment.

Since the drive energy is obtained from the hydrogen pressure which is in any event present, through the relaxation of the hydrogen pressure, no additional energy need be supplied, so that the power yield from the fuel cells is not reduced by the energy required for the driving of the pump.

Preferred embodiments of the invention can be found in the subordinate claims and also in the further description and in the accompanying drawings.

DESCRIPTION OF THE PREFERRED EMBODIMENT

Figure 1:
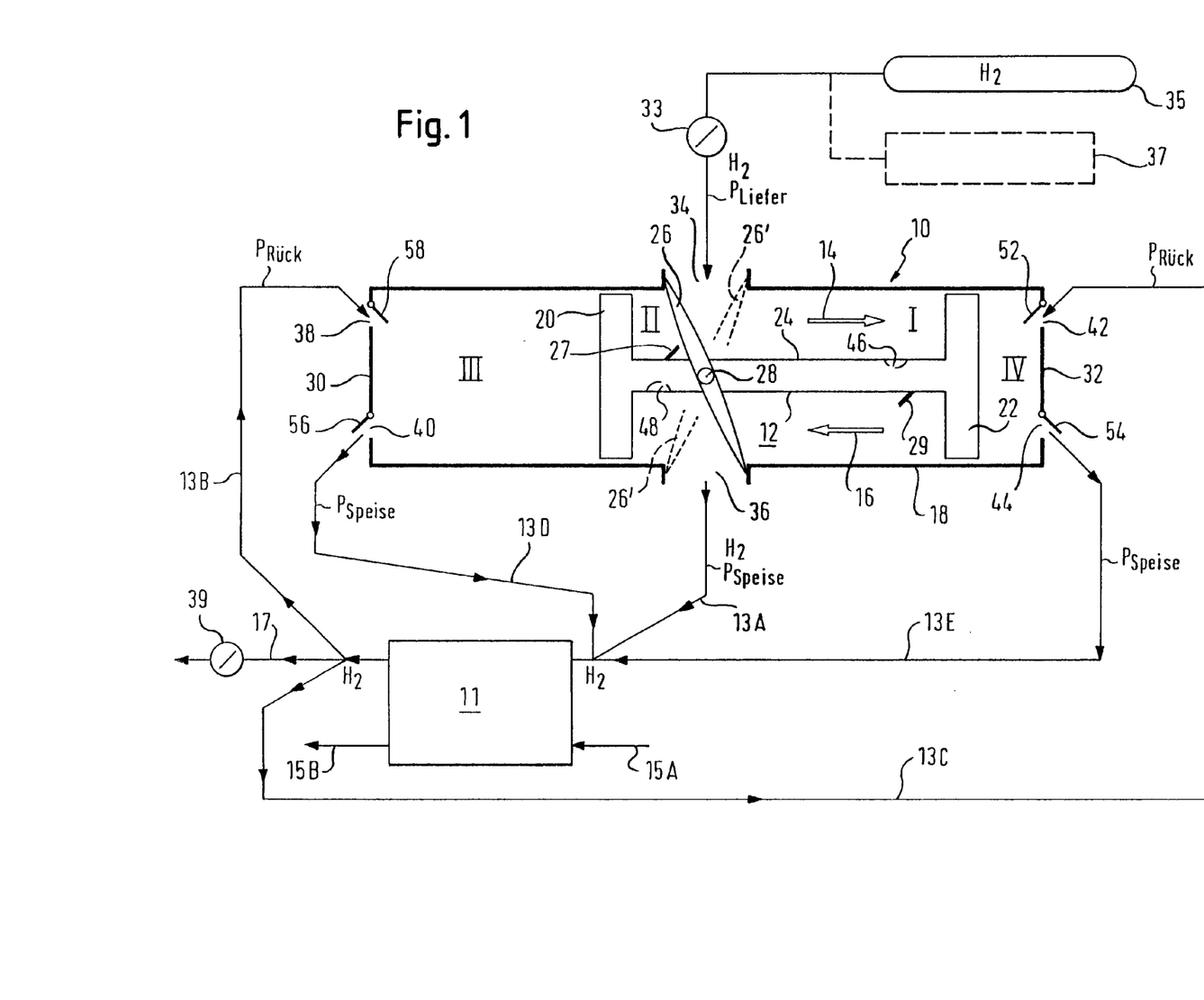
FIG. 1 is a schematic representation of a first embodiment of a hydrogen feed system in accordance with the invention using a piston pump.

FIG. 1 shows a double-acting piston pump 10 which delivers hydrogen from a supply tank 35 or from a reforming unit 37 to the anode side of a fuel cell arrangement 11 via a schematically illustrated line 13A and supplies a part of the excess hydrogen emerging from the fuel cells at the anode side back to the fuel cells anew via a return loop. The return loop comprises in this example schematically indicated lines 13B and 13C which lead from the fuel cell arrangement 11 to connections 38 and 42 at the end faces 30 and 32 of the pump 10 and lines 13D and 13E which lead from the connections 40 and 44 at the ends 30 and 32 of the pump 10 to the fuel cell arrangement. In a practical embodiment the lines 13B and 13C and the lines 13A, 13D and 13E can each be realized as a line which lead via internal passages of the pump housing to the respective connections or to the corresponding openings of the pump. The pump is thus incorporated into the return loop. The return loop 13B, 13C, 13D, 13E together with the line 13A and the flow paths within the pump 10 and at the anode side of the fuel cell arrangement 11 form the hydrogen circuit.

In a manner known per se, the fuel cell arrangement 11 also has a cathode side to which air is supplied via the line 15A. Protons, which are delivered by the hydrogen at the anode side, are transported by means of the membranes contained in the fuel cells to the cathode side and react there with oxygen from the air that is supplied to form water, which leaves the cathode side of the fuel cells via the line 15B in the form of water vapor together with excess air or air components, such as nitrogen, which do not participate in the reaction.

The action of the pump 10 will be explained in more detail in the following. It has a double piston 12 which, depending on the prevailing pressure conditions, can be moved to the right in accordance with the arrow 14 and to the left in accordance with the arrow 16 within a cylinder housing 18. The double piston 12 has two piston heads 20 and 22 which are connected together via a hollow connection part 24. A valve flap 26 is tiltably mounted at the cylinder housing 18 via a pivot axle 28, so that it can be tilted between the inclined position shown in continuous lines and a likewise inclined second position 26' which is schematically illustrated in broken lines. The pivot axle 28 can be so designed that it either does not pass through the cylinder housing at all or is realized by stub axles which are stationary in operation and are completely sealed off relative to the cylinder housing.

The tilting or rocking motion of the valve flap 26 takes place here through a to and fro movement of the double piston 12. When the piston is moved further to the right in the direction of the arrow 14, the valve flap 26 is tilted by an abutment 27 present on the connecting part 24 into the broken line position 26', whereas, with a subsequent movement of the double piston 12 to the left in accordance with the arrow 16, the valve flap 26 is moved back into the position shown in continuous lines in FIG. 1 by the further abutment 29 provided on the connecting part.

In the illustrated arrangement four pressure chambers I, II, III and IV are present, with the pressure chamber I being provided between the valve flap 26 and the piston head 22, the pressure chamber II between the valve flap 26 and the piston head 20, the pressure chamber III between the piston head 20 and the left-hand end 30 of the cylinder 18 and the pressure chamber IV between the piston head 22 and the right-hand end 32 of the cylinder 18.

Between the valve flap 26 and the connecting part and between the valve flap 26 and the cylinder housing 18 there are seals (not shown) in order to seal off the chamber I relative to the chamber II in both positions of the valve flap 26. Between the piston head 20 and the cylinder housing 18 and between the piston head 22 and the cylinder housing 18 there are further seals (not shown) which seal off the chamber II relative to the chamber III and the chamber I relative to the chamber IV respectively.

The double piston pump 10 has in this example six connections 34, 36, 38, 40,42 and 44. The connection 34 is connected to a supply rank 35 which contains hydrogen $H_2$ and delivers this at a constant drive pressure to the connection 34. In order to achieve this constant drive pressure, a pressure regulating valve 37 is provided between the supply tank 35 and the connection 34. In the position shown in FIG. 1, hydrogen flows at the delivery pressure $P_{delivery}$ into the pressure chamber I and flows via a restrictor 46 adjacent to the piston head 22 into the hollow connecting part 24. The hydrogen leaves the hollow connecting part 24 again via a second restrictor 48 and is then located in the pressure chamber II.

The restrictors 46 and 48 need not necessarily be provided in a hollow connection part 24, they can, for example, be provided in the valve flap 26 or in a suitable flow passage in the cylinder housing 18. In other respects it is not essential to provide two restrictors, a single restrictor is sufficient.

In the position shown in FIG. 1, hydrogen is supplied with reduced pressure in accordance with the arrow 13A and 13E to the fuel cells 11. This pressure is termed here $P_{feed}$. One can thus write a first equation, namely:

$$P_{feed} = P_{delivery} - \Delta P_{46,48} \qquad 1)$$

where $\Delta P_{46,48}$ represents the pressure loss via the restrictors 46 and 48.

In the fuel cells a part of the H2 supplied to the anode side migrates in the form of protons through the membrane that is present there, so that at the outlet of the fuel cells at the anode side the remainder of the supplied hydrogen is present as $H_2$-containing exhaust gases (the exhaust gases also include water vapor which originates from the anode side of the membrane). These exhaust gases have a pressure which is lower than the pressure $P_{feed}$ and a part of these exhaust gases is supplied with a pressure which is designated here by $P_{return}$ to the connection 38 and to the connection 42.

A further part of the $H_2$-containing exhaust gases is removed from the hydrogen circuit via a pressure regulating valve 39 as exhaust gases and is further used in a manner known per se, it is, for example, burned for heat recovery or for the sake of safety.

It is now assumed that the double piston 12 moves in accordance with the arrow 14, the corresponding pressure build-up in the chamber IV leads to a non-return valve 52 adjacent the connection 42 being closed and to a non-return valve 54 adjacent to the connection 44 being opened. The pressure in chamber II also increases. The exhaust gases present in the chamber IV which previously had the pressure $P_{return}$ are now compressed and leave the connection 54 at an elevated pressure $P_{feed}$, so that they can be supplied with the gases from the connection 36 to the fuel cells.

At the end of the movement in accordance with the arrow 14, the valve flap 26 swings by contact with the abutment 27 into the broken line position 26' and the pressure relationships ensure, as will later be explained in more detail, that the double piston 12 moves to the left in accordance with the arrow 16. During this the gases which are present in the chamber III with the initial pressure $P_{return}$ are forced, as a result of the movement of the double piston, at an elevated pressure $P_{feed}$ out of the non-return valve 56 arranged adjacent to the connection 40. The gases present in the chamber I are also forced out of the chamber I by this movement of the double piston. At the same time, the non-return valve 58 which is arranged adjacent to the connection 38 closes and prevents further $H_2$-containing exhaust gases from flowing into the chamber III and prevents compressed $H_2$-containing exhaust gases being forced out of the connection 38 again. The exhaust gases which leave the cylinder 18 at the connection 40 are then supplied again to the fuel cells together with the $H_2$ coming from the connection 36.

During the movement of the double piston 12 to the left in accordance with the arrow 16 a depression arises in the chamber IV, whereby the non-return valve 54 closes and the non-return valve 52 opens in order to allow $H_2$-containing exhaust gases from the fuel cells at the pressure $P_{return}$ to enter into the chamber IV. When the double piston 12 has reached its extreme left-hand position, the valve flap 26 swings over again on contact with the abutment 29 and the piston now starts to move to the right again under the prevailing pressure conditions in accordance with the arrow 14, whereby the working cycle repeats. The pressure conditions are so selected by the design of the non-return valves 52, 54, 56 and 58 and by the design of the restrictors 46, 48 that this manner of operation continuously repeats and the hydrogen gas is always supplied at the pressure $P_{feed}$ to the fuel cells 11. A part of these gases consisting of H2 thus consist, so to say, of fresh hydrogen which comes from the tank (or from a reforming unit), whereas a further part of the hydrogen supplied to the fuel cells consists of exhaust gases of the fuel cells consisting of $H_2$ and water vapor.

Important in this arrangement is that the pump is operated solely by the drive pressure $P_{delivery}$ and is fully contained in the hydrogen circuit or in the return loop. There is thus no motor positioned outside of the hydrogen circuit, i.e. outside of the wall of the line system conducting the hydrogen, which has to drive anything in the $H_2$, circuit via a shaft, so that the entire $H_2$ circuit can be executed in closed manner. There is thus no danger that $H_2$ can escape from leaky positions because, as stated, no shaft is present which leads from the outside into the pump system, so that a leakage at such a shaft cannot occur.

In order to explain the pressure forces which lead to the movement of the double piston 12 and which are responsible for the realization of the working cycle in more detail, a mathematical treatment of the sequence of movement will now be given.

It is first assumed that the double piston 12 moves to the right in accordance with the arrow 14 and that the valve flap 26 has the position shown in continuous lines in FIG. 1. It is moreover assumed that the piston heads 20 and 22 have an effective area A on both sides. As a result, a force $K_{IR}$ directed to the right acts in the chamber I on the piston 12 of:

$$K_{IR}=P_{delivery} \times A$$

In the chamber II a force acts in the opposite direction, i.e. to the left, on the piston 12 of:

$$K_{IIL}=P_{feed} \times A.$$

In the chamber III a pressure $P_{return}$ prevails and this acts on the piston 12 to the right with a force of:

$$K_{IIIR}=P_{return} \times A$$

In the chamber IV the feed pressure $P_{feed}$ again prevails, so that in the chamber IV a force acts on the double piston 12 which is directed to the left of:

$$K_{IVL}=P_{feed} \times A$$

Now all the forces which act on the double piston 12 in the direction to the right are summed up, that is to say that the total force to the right $K_{GR}$ results from the force $K_{IR}$ which originates from the chamber I plus the force $K_{IIIR}$ which results from the chamber III, i.e.:

$$K_{GR}=K_{IR}+K_{IIIR}=P_{delivery} \times A+P_{return} \times A \qquad 2)$$

The total force to the left amounts to $K_{GL}$:

$$K_{GL}=K_{IIL}+K_{IVL}=P_{feed} \times A+P_{feed} \times A=2P_{feed} \times A \qquad 3)$$

Furthermore $P_{return}=P_{feed}-\Delta P_{Br}$ \qquad 4)

applies where $\Delta P_{Br}$ is the pressure loss of the hydrogen at the anode side of the fuel cell system (measured between the inlet and the outlet) with this pressure or pressure difference also being determined by the pressure regulating valve 39 and/or by the consumed hydrogen (since the valve 39 may also be an on/off valve which is only discontinuously opened for venting purposes to vent, e.g. nitrogen which has accumulated in the anode circuit) which ultimately ensures that the pressure at the outlet of the anode side of the fuel cells lies at $P_{return}$.

As a consequence, the total force $K_G$ which acts on the piston 12 to the right is given by the following equation:

$$K_G=K_{GR}-K_{GL}=(P_{delivery} \times A+P_{return} \times A)-2P_{feed} \times A \qquad 5)$$

Taking account of the equation 4) one can write:

$$K_G = A(P_{delivery} + (P_{feed} - \Delta P_{Br}) - 2P_{feed}) \qquad 6)$$
$$= A(P_{delivery} - P_{feed} - \Delta P_{Br})$$

Taking account of the equation 1) one can simplify this equation as follows:

$$K_G = A((P_{feed} + \Delta P_{46,48}) - P_{feed} - \Delta P_{Br}) \qquad 7)$$
$$= A(\Delta P_{46,48} - \Delta P_{Br})$$

Since A is constant, one can see that the condition for a positive net force directed to the right on the piston 12 is:

$$\Delta P_{46,48} > \Delta P_{Br}$$

i.e., the total pressure loss at the restrictors 46, 48 must be greater than the pressure loss between the inlet and the outlet of the hydrogen circuit in the fuel cell arrangement.

This equation is admittedly not entirely correct, because the effective area of the piston heads 20, 22 in the chambers I, II are somewhat smaller than A, because the connection part 24 has a finite cross-sectional area. Nevertheless, the correction that is required is relatively small so that the condition set forth applies at least approximately.

The above treatment applies for the movement of the double piston 12 to the right. At the end of this movement, the valve flap 26 is changed over or swung over and then the same relationship applies for the movement of the double piston to the left. Thus, a continuous to and fro movement of the double piston is achieved and indeed irrespective of the actual hydrogen requirement for the fuel cell system so that the pumping action is effective under all load conditions and thus also functions at low loads or with a low power yield of the fuel cell system.

It has been found that the restrictors 46 and 48 are not actually necessary and that a restrictor can indeed be omitted altogether with advantage. In this case the connecting part 24 of the double piston 12 does not need to be hollow, since flow no longer takes place through the hollow connecting rod between the chambers I and II. The possibility of omitting the restrictors and avoiding flow through the connecting rod might at first seem rather surprising in view of the equations given above. However, if the restrictors are omitted, then this is equivalent to setting $\Delta P_{46,48}$ equal to infinity and the equation $$\Delta P_{46,48} > \Delta P_{Br}$$

is always satisfied since with flow through the fuel cell system $\Delta P_{Br}$ will always be finite.

The equations set out above in any case cover the case in which flow takes place through the fuel cell system and are to some extent an oversimplification because they ignore the fact that hydrogen is also consumed in the fuel cells, i.e. leaves the anode circuit via the permeable cell membranes and reacts with oxygen at the cathode side. In fact equation 6) indicates that if no hydrogen is consumed this leads to $\Delta P_{Br}=0$ and $P_{feed}=P_{delivery}$ which means that the force $K_G=0$. $K_G>0$ means that $$P_{delivery} - P_{feed} - \Delta P_{Br} > 0$$

Thus $$P_{delivery} > P_{feed} + \Delta P_{Br} \quad 8)$$

Since equation 4) shows that $P_{return} = P_{feed} - \Delta P_{Br}$ $$\Delta P_{Br} = P_{feed} - P_{return} \quad 9)$$

and equation 8) can be changed to $$P_{delivery} > P_{feed} + P_{feed} - P_{return}$$

i.e.

$$P_{delivery} > 2P_{feed} - P_{return} \quad 10)$$

If we set $P_{return}$ to be slightly less than $P_{feed}$, indicating that the fuel cell system has started working by consuming hydrogen then, equation 10) makes it clear that $P_{delivery}$ is slightly greater than $P_{feed}$ which shows that as soon as $P_{feed}$ is reduced by consuming hydrogen the pump starts working.

Thus if the pressure loss at the restrictors is infinitely high, i.e. no restrictor is provided, the pump will always work as soon as hydrogen is consumed in the fuel cell.

Figure 2:
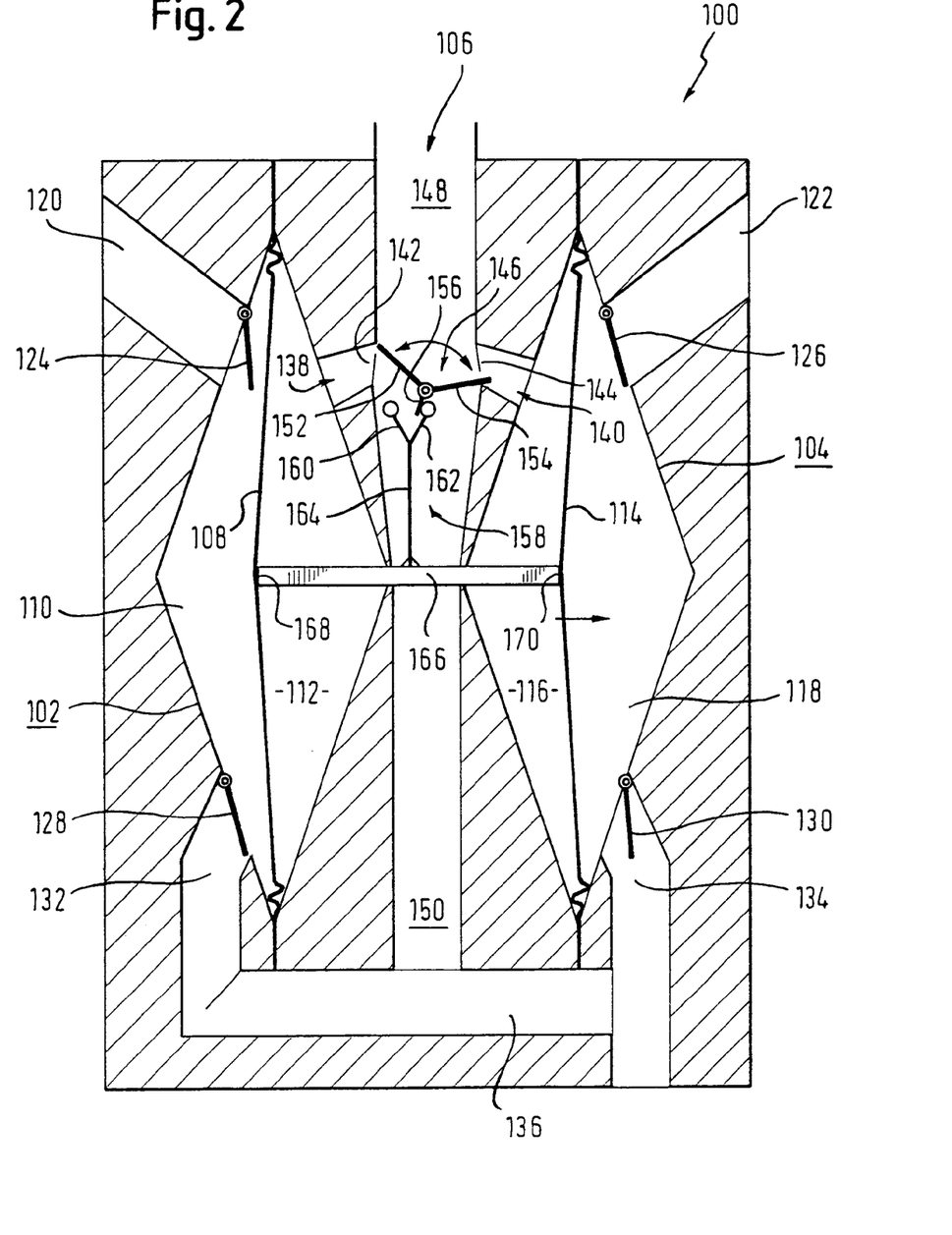
FIG. 2 is a schematic representation of a membrane pump in accordance with the invention during a first half of a pumping cycle.
Figure 3:
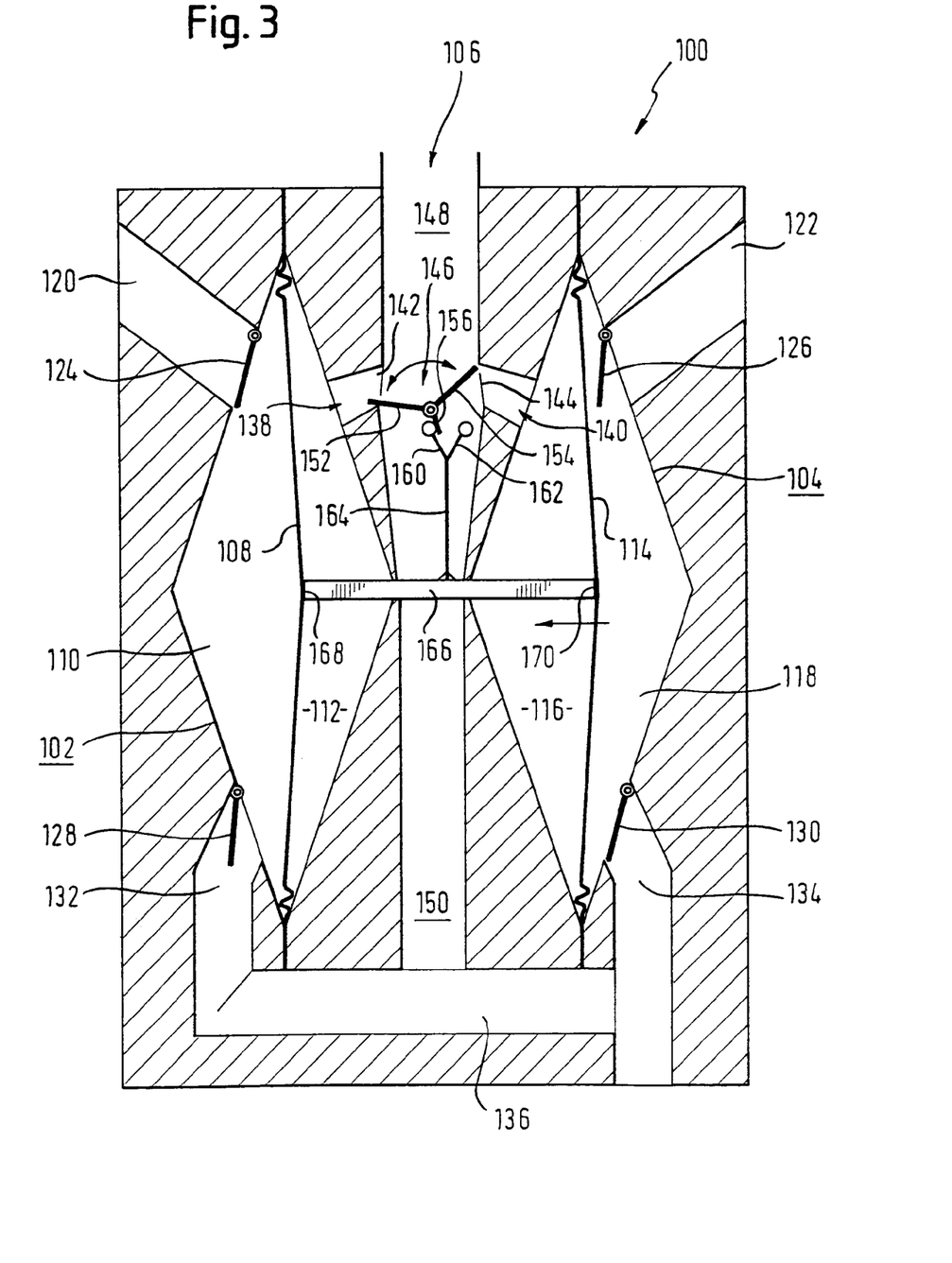
FIG. 3 is a schematic representation of the membrane pump of FIG. 2 during a second half of a pumping cycle.

As an alternative the piston pump 10 in the hydrogen feed system shown in FIG. 1 a membrane pump 100 can also be used in accordance with the invention as is, for example, shown in FIGS. 2 and 3.

The membrane pump 100 has a first membrane chamber 102 and a second membrane chamber 104 between which a gas passage 106 is disposed. The membrane chambers 102, 104 have identical cross-sections which are extended in a direction parallel to the gas passage 106 and, in this example, are of symmetrical diamond shape, which is not mandatory.

The first membrane chamber 102 is divided by a first membrane 108 into a first outer chamber space 110 and a first inner chamber space 112 and the second membrane chamber 104 is divided by a second membrane 114 into a second inner chamber space 116 and a second outer chamber space 118. The membranes 108, 114 extend substantially parallel to one another on both sides of the gas passage 106.

A coupling element 166 couples the membranes 108, 114 together mechanically, with the ends 168, 170 of the coupling element 166 being attached to the membranes 108, 114 in the vicinity of the membrane centers. The coupling element 166 has a degree of freedom of movement in the direction extending perpendicular to the plane of the membranes 108, 114.

The outer chamber spaces 110, 118 are respectively provided with an inlet 120, 122 in an end region associated with a supply tank, with each inlet being equipped with a non-return valve 124, 126 and serving for the supply of unused hydrogen from the fuel cell arrangement. Furthermore, the outer chamber spaces 110, 118 each have an outlet 132, 134 respectively provided with a corresponding non-return valve 128, 130 in their end region associated with the fuel cells in order to feed hydrogen at an elevated pressure in a collection line 136 back to the fuel cell arrangement again.

Furthermore, a passage 138, 140 is in each case provided which connects the end regions of the inner chamber spaces 112, 116 at the supply tank side to the gas passage 106. The passage openings 142, 144 of the passages 138, 140 at the gas passage side are located in this example at the same level and at opposite sides of the gas passage 106.

In the region of the passage openings 142, 144 a rocker valve or flap valve 146 is provided in the gas passage 106 and it divides the gas passage 106 into a section 148 associated with the supply tank and a section 150 associated with the fuel cell arrangement.

The rocker valve 146 has two sealing limbs 152, 154 and a tilting limb 156 which are arranged in a Y-shape and connected together. The rocker valve 146 is pivotally mounted at the point at which all three limbs adjoin one another. The sealing limbs 152, 154 are formed such that they can close the passage openings 142, 144 either with respect to the section 148 adjacent the supply tank or with respect to the section 150 of the gas passage associated with the fuel cell arrangement.

The rocker valve 146 can only adopt two stable positions, i.e. switching states. In the first position (FIG. 2) the first passage opening 142 is sealed off relative to the section 148 of the gas passage 106 associated with the supply tank and is open towards the section 150 associated with the fuel cell arrangement, while the second passage opening 144 is open towards the section 148 of the gas passage associated with the supply tank and is sealed off with respect to the section 150 associated with the fuel cell arrangement. Gas flowing out of the supply tank into the gas passage 106 can thus only pass into the second inner chamber space 116 while gas from the first inner chamber space 112 can flow into the section 150 of the gas passage 106 associated with the fuel cell arrangement.

In the second position, which is shown in FIG. 3, the flow relationships are directly reversed, i.e. gas flowing out of the supply tank into the gas passage 106 can only pass into the first inner chamber space 112, whereas gas from the second inner chamber space 116 is able to flow into the section 150 of the gas passage 106 associated with the fuel cell arrangement.

The rocker valve 146 is switched with the aid of its tilting limb 156, which is actuated by a drive element 158. The drive element 158 has a V-shaped fork section formed by first and second fork limbs 160, 162 into which the tilting limb 156 engages. After a displacement of the fork section in a direction perpendicular to the gas passage 106 by an amount which corresponds to the spacing of the free ends of the fork limbs 160, 162, one of the fork limbs 160, 162 enters into contact with the tilting limb 156 and acts on this with a force which leads to the tilting valve 146 switching over and adopting its other position. The fork section is rigidly connected with the aid of the rod section 164 to the rod-like coupling element 166. The coupling element 166 results in a synchronous deflection of the first and second membranes 108, 114. An adequate deflection of the membranes 108, 114 leads to an actuation of the rocker valve 146.

The manner of operation of the membrane pump 100 is as follows:

At the start of the first half of the pumping cycle shown in FIG. 2 the membranes 108, 114 have a maximum deflection to the left, i.e. the coupling element 166 and thus also the fork section and the tilting limb 156 are located in their left hand position. The rocker valve 146 adopts the position which is hereby termed the first position in which the passage 138 forms a flow connection from the first inner chamber space 112 to the section 150 associated with the fuel cell arrangement and the passage 140 forms a flow connection from the section 148 of the gas passage 106 associated with the supply tank to the second inner chamber space 116.

Hydrogen from the supply tank thus flows through the gas passage 106 and the open second passage opening 144 into the second inner chamber space 116. This increases the pressure in the second inner chamber space 116 and leads to a deflection of the membranes 108, 114 to the right. In this way the volume of the second outer chamber space 118 is made smaller and the gas present therein is compressed and displaced through the non-return valve 130 and the outlet 134 into the collection line 136.

Furthermore, through the elevated pressure, the non-return valve 126 is closed so that no additional hydrogen returned from the fuel cell arrangement can flow into the second outer chamber space 118.

At the same time the volume of the first inner chamber space 112 is reduced through the deflection of the membranes 108, 114. Gas present therein is urged through the open passage 138 into the section 150 of the gas passage 106 associated with the fuel cell arrangement and likewise enters into the collection line 136.

Moreover, the volume of the first outer chamber space 110 is enlarged through the movement of the membranes 108, 114 and as a consequence a depression is produced in the first inner chamber space 110. Through the depression the non-return valve 128 at the outlet 132 is closed so that no hydrogen can flow from the collection line 136 back into the first outer chamber space 110. Instead of this the depression generates a suction action which leads to opening of the non-return valve 124 and the inlet 120 of the first outer chamber space 110 and sucks in hydrogen returned from the fuel cell arrangement.

The coupling element 166 and with it the drive element 158, i.e. the fork section, moves to the right together with the membranes 108, 114. If the extreme deflection of the membranes 108, 114 is reached then the left limb 160 of the fork of the drive element 158 moves the tilting limb 156 with it and actuates in this manner the rocker valve 146.

The rocker valve 146 then rocks over and adopts its second position. Thus the second half of the pumping cycle starts, in which the first inner chamber space 112 is filled with hydrogen which flows in through the gas passage 106 out of the supply tank. The above-described process takes place in the reverse direction The pressure ($P_{delivery}$) with which the hydrogen coming from the supply tank or from the reformer unit is thus reduced into the gas passage 106 and may for example lie at about 300 kPa overpressure (gage pressure) while the relaxed hydrogen is supplied to the fuel cells with a feed pressure ($P_{feed}$) which may be approximately 220 kPa overpressure. The $H_2$ containing exhaust gases which are partly returned from the fuel cells back into the membrane pump 100 have a pressure ($P_{return}$) which may be approximately 180 kPa overpressure at the inlets 120, 122.

In a modified embodiment the drive element 158 can be formed by a spring or lever element which interacts with the rocker valve 146 and the coupling element 166 and which adopts or defines the fine two stable positions in accordance with FIGS. 2 and 3 respectively.

In the membrane pump 100 a continuous to and fro movement of the membranes 108, 114 is achieved which is driven solely by the gas flow, which is substantially independent of the quantity of hydrogen flowing. It thus also still functions at low loads or with low power output of the fuel cell system. In this example the flow to the fuel cells is the recycled flow plus the flow from the tank. It will be noted that the membrane pump embodiment does not involve any flow restrictors, further confirming that these are not necessary in the piston pump embodiment.

What is claimed is:

1. A hydrogen feed system for a fuel cell arrangement, said feed system being adapted to receive hydrogen at a delivery pressure from a supply, to relax said hydrogen from said delivery pressure to a feed pressure and to feed said hydrogen to a fuel cell arrangement having an anode side, said hydrogen feed system being further adapted to receive hydrogen containing exhaust gases at a return pressure from a said anode side and to feed them together with hydrogen at said feed pressure to a said fuel cell arrangement, said hydrogen feed system comprising a pump driveable by pressure energy derived from said hydrogen at said delivery pressure.

2. A hydrogen feed system in accordance with claim 1, said pump having a pump housing having a wall, being hermetically sealed off relative to an environment and having no shaft extending through the wall.

3. A hydrogen feed system for a fuel cell arrangement, said feed system being adapted to receive hydrogen at a delivery pressure from a supply, to relax said hydrogen from said delivery pressure to a feed pressure and to feed said hydrogen to a fuel cell arrangement, said fuel cell arrangement having an anode side with an inlet for hydrogen, an outlet for hydrogen containing exhaust gases and a hydrogen recirculation circuit extending between said outlet and said inlet for receiving hydrogen containing exhaust gases at a return pressure from said outlet and feeding them together with hydrogen from said supply to said fuel cell arrangement, said hydrogen feed system comprising a pump provided in said hydrogen recirculation circuit and adapted to receive said hydrogen containing exhaust gases at said return pressure and increase their pressure for feeding them with hydrogen received directly by said pump from said supply to said fuel cell arrangement, said pump being driveable by pressure energy derived from said hydrogen at said delivery pressure.

4. A hydrogen feed system in accordance with claim 3, said supply comprising a hydrogen storage tank.

5. A hydrogen feed system in accordance with claim 3, said supply comprising a reforming unit.

6. A hydrogen feed system in accordance with claim 3, said supply comprising a pressure regulating valve disposed upstream of said pump for feeding hydrogen to said pump at said delivery pressure.

7. A hydrogen feed system in accordance with claim 3, said pump being a displacement pump.

8. A hydrogen feed system in accordance with claim 7, said displacement pump being a piston pump.

9. A hydrogen feed system in accordance with claim 7, said displacement pump is a double-acting piston pump.

10. A hydrogen feed system in accordance with, claim 9 said double-acting piston pump baying a cylinder, first and second piston heads and a connecting member for coupling said piston heads together in spaced apart relationship, said piston heads being movable to and fro in said cylinder, said cylinder having first and second ends, there being a first cylinder space formed between said first piston head and said first end and a second cylinder space formed between the second piston head and said second end, each said cylinder space having an inlet in said hydrogen recirculation circuit for receiving hydrogen containing exhaust gases coming from said fuel cell arrangement and an outlet in said hydrogen recirculation circuit leading to said fuel cell arrangement, with respective non-return valves being associated with each inlet and outlet of said cylinder spaces.

11. A hydrogen feed system in accordance with claim 10, and further comprising a valve member adapted to be changed over between first and second positions to bring about said to and fro movement of said piston heads in response to said delivery pressure of said hydrogen supplied to said pump.

12. A hydrogen feed system in accordance with claim 11, said valve member being a valve flap, there being an axle pivotally supporting said valve flap and said valve flap subdividing said cylinder between said first and second piston heads into third and fourth cylinder spaces which, depending on the position of said valve member, are alternately pressurized by said delivery pressure.

13. A hydrogen feed system in accordance with claim 12, said cylinder having a housing wall, a middle portion, an inlet in said housing wall at said middle portion for receiving hydrogen from said supply at said delivery pressure and an outlet in said housing wall at said middle portion for feeding hydrogen to said fuel cell arrangement, said outlet in said housing wall being opposite to said inlet in said housing wall and said valve flap being disposed between said inlet in said housing wall and said outlet in said housing wall.

14. A hydrogen feed system in accordance with claim 13, said valve flap having an aperture, said connecting member extending through said aperture and a seal being provided between said valve flap and said connecting member.

15. A hydrogen feed system in accordance with claim 14, and further comprising a flaw path extending between said third and fourth cylinder spaces and a restrictor disposed in said flow path.

16. A hydrogen feed system in accordance with claim 15, said flow path and said restrictor being provided in said valve flap.

17. A hydrogen feed system in accordance with claim 15, said flaw path being provided in said cylinder housing.

18. A hydrogen feed system in accordance with claim 14, said connecting member defining a flow path extending between said third and fourth cylinder spaces, said at least one restrictor being disposed in said flow path.

19. A hydrogen feed system in accordance with claim 12, and further comprising first and second abutments provided on said connecting member for moving said valve flap between its said first and second positions in response to said to and fro movement of said piston heads.

20. A hydrogen feed system in accordance with claim 12, and further comprising first and second abutments provided on said piston heads for moving said valve flap between its said first and second positions in response to said to and fro movement of said piston heads.

21. A hydrogen feed system in accordance with claim 7, said displacement pump being a membrane pump.

22. A hydrogen feed system in accordance with claim 21, said membrane pump having a first membrane chamber and a second membrane chamber and a gas passage arranged between said first and second membrane chambers, said gas passage having a first section having an inlet for receiving hydrogen at said delivery pressure from said supply and a second section having an outlet for feeding hydrogen to said fuel cell arrangement.

23. A hydrogen feed system in accordance with claim 22, said first and second membrane chambers having respective first and second gas impermeable membranes, said first membrane dividing said first membrane chamber into first outer and inner chamber spaces and said second membrane dividing said second membrane chamber into second outer and inner chamber spaces.

24. A hydrogen feed system in accordance with claim 23, said outer chamber spaces each having an inlet in said hydrogen recirculation circuit for receiving hydrogen containing exhaust gases from said fuel cell arrangement and an outlet leading to said fuel cell arrangement, there being a respective non-return valve associated with each inlet and outlet of said outer chamber spaces and said inner chamber spaces being connected via corresponding first and second passages to said gas passage.

25. A hydrogen feed system in accordance with claim 24, said first and second membranes having respective centers and said pump further comprising a coupling element, said first and second membranes being mechanically coupled together by said coupling element which is attached to said membranes at said centers, so that they are synchronously deflectable in a direction substantially perpendicular to the gas passage.

26. A hydrogen feed system in accordance with claim 25, and further comprising a rocker valve having first and second positions and arranged in said gas passage, whereby when said rocker valve is in its first position, said first inner chamber space is closed off relative to said first section of said gas passage and said second inner chamber space is closed off relative to said second section of said gas passage but is connected to said first section and, when said rocker valve is in said second position, said second inner chamber space is closed off relative to said first section of said gas passage and said first inner chamber space is closed off relative to said second section of said gas passage but is connected to said first section.

27. A hydrogen feed system in accordance with claim 26, said rocker valve having first and second sealing limbs and a tilting limb which are arranged in the manner of a Y-shape, said limbs being fixedly connected together at a connection point and being pivotally mounted in the region of said connection point, and said first and second sealing limbs each being associated with a respective one of said first and second passages.

28. A hydrogen feed system in accordance with claim 25, and further comprising a drive element connected to said coupling element, said rocker valve being actuatable by said drive element.

29. A hydrogen feed system in accordance with claim 28, said drive element having a rod section with first and second ends and being substantially rigidly connected to said coupling element at its first end and having a V-shaped fork section formed by two fork limbs at its second free end, in such a way that a force can be exerted by said fork limbs on said tilting limb.

30. A hydrogen feed system in accordance with claim 29, said drive element being formed by one of a spring and lever element interacting with said rocker valve and said coupling element.

31. A hydrogen feed system in accordance with claim 25, and further comprising a collecting line leading to said fuel cell arrangement, said outlets of said outer chamber spaces and said second section of said gas passage being connected to said collecting line.

32. A hydrogen feed system in accordance with claim 3, said hydrogen recirculation circuit having an outlet downstream of said fuel cell arrangement through which excess hydrogen containing exhaust gases can be led away.

33. A hydrogen feed system in accordance with claim 32 and further comprising a pressure regulating valve which is provided at said outlet of said hydrogen recirculation circuit.

34. A hydrogen feed system in accordance with claim 3, said pump having a pump housing having a wall, being hermetically sealed off relative to an environment and having no shaft extending through the wall.

* * * * *